United States Patent
Choi et al.

(10) Patent No.: US 11,291,023 B2
(45) Date of Patent: Mar. 29, 2022

(54) APPARATUS AND METHOD FOR SCHEDULING IN WIRELESS COMMUNICATION SYSTEM

(71) Applicant: Samsung Electronics Co., Ltd., Suwon-si (KR)

(72) Inventors: Okyoung Choi, Suwon-si (KR); Hojoong Kwon, Suwon-si (KR); Myungkwang Byun, Suwon-si (KR); Hanseok Kim, Suwon-si (KR); Sungho Lee, Suwon-si (KR); Seunghwan Lee, Suwon-si (KR); Dowon Hyun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/961,466

(22) PCT Filed: Jan. 11, 2019

(86) PCT No.: PCT/KR2019/000449
§ 371 (c)(1),
(2) Date: Jul. 10, 2020

(87) PCT Pub. No.: WO2019/139400
PCT Pub. Date: Jul. 18, 2019

(65) Prior Publication Data
US 2021/0092753 A1 Mar. 25, 2021

(30) Foreign Application Priority Data
Jan. 12, 2018 (KR) .................. 10-2018-0004415

(51) Int. Cl.
*H04W 72/12* (2009.01)
(52) U.S. Cl.
CPC .............. *H04W 72/1231* (2013.01)

(58) Field of Classification Search
CPC ................................. H04W 72/1231
See application file for complete search history.

(56) References Cited

U.S. PATENT DOCUMENTS 7,602,872 B2 * 10/2009 Suh .............. H04L 5/0071
375/357
7,760,739 B2 * 7/2010 Jung .............. H04L 47/14
370/395.21

(Continued)

FOREIGN PATENT DOCUMENTS

| EP | 2 549 819 A1 | 1/2013 |
| KR | 10-2007-0099212 A | 10/2007 |
| KR | 10-2017-0058244 A | 5/2017 |

OTHER PUBLICATIONS

Sun Qiaoyun et al., A QoS Aware Scheduling Scheme for Multiple Traffics with Reduced Feedback, Wireless Communications Networking and Mobile Computing (WICOM), 2010 6th International Conference on, IEEE, XP031774224, ISBN: 978-1-4244-3708-5, pp. 1-4, Sep. 23, 2010, Piscataway, NJ, USA.

(Continued)

*Primary Examiner* — Parth Patel
(74) *Attorney, Agent, or Firm* — Jefferson IP Law, LLP

(57) ABSTRACT

The present disclosure relates to a pre-5th-Generation (5G) or 5G communication system to be provided for supporting higher data rates beyond 4th-Generation (4G) communication system such as long term evolution (LTE). A terminal in a wireless communication system is provided. The terminal includes a transceiver, and at least one processor configured to receive, from a base station (BS), a beam failure recovery configuration comprising at least one reference signal for identifying a candidate beam for the beam failure recovery and associated random access (RA) parameters, identify the candidate beam for the beam failure recovery using the at least one reference signal, and perform a physical random (Continued)

access channel (PRACH) using the at least one reference signal and the associated RA parameters on the candidate beam for the beam failure recovery.

17 Claims, 9 Drawing Sheets

(56) References Cited

U.S. PATENT DOCUMENTS

| | | | | |
|---|---|---|---|---|
| 7,769,389 | B1* | 8/2010 | Mangai | H04W 28/20 455/452.1 |
| 7,856,241 | B2* | 12/2010 | Ishii | H04W 74/06 455/513 |
| 8,005,087 | B2* | 8/2011 | Dolganow | H04W 72/1236 370/392 |
| 8,670,419 | B2* | 3/2014 | Chin | H04L 5/0007 370/336 |
| 9,392,579 | B2* | 7/2016 | Roh | H04W 72/1247 |
| 11,025,318 | B2* | 6/2021 | Zhu | H04W 16/28 |
| 11,071,119 | B2* | 7/2021 | Inokuchi | H04W 72/0486 |
| 2005/0281189 | A1* | 12/2005 | Lee | H04L 5/023 370/208 |
| 2005/0286438 | A1* | 12/2005 | Rajkotia | H04L 47/10 370/252 |
| 2006/0045094 | A1* | 3/2006 | Yun | H04L 47/2433 370/395.4 |
| 2006/0094436 | A1* | 5/2006 | Kim | H04W 72/085 455/450 |
| 2008/0195450 | A1* | 8/2008 | Cho | G06Q 10/06375 705/7.12 |
| 2009/0285196 | A1* | 11/2009 | Lee | H04W 28/02 370/345 |
| 2010/0081448 | A1* | 4/2010 | Wong | H04W 72/121 455/452.1 |
| 2011/0021232 | A1* | 1/2011 | Kazmi | H04W 72/1289 455/509 |
| 2013/0331110 | A1* | 12/2013 | Jia | H04W 28/06 455/450 |
| 2014/0036862 | A1* | 2/2014 | Lorca | H04W 72/085 370/330 |
| 2015/0043423 | A1* | 2/2015 | Hadef | H04L 5/0044 370/315 |
| 2015/0092704 | A1* | 4/2015 | Chen | H04W 72/1231 370/329 |
| 2015/0156780 | A1* | 6/2015 | Kim | H04W 36/22 370/331 |
| 2016/0204838 | A1* | 7/2016 | Park | H04W 72/1205 370/252 |
| 2016/0295604 | A1* | 10/2016 | Ohta | H04J 11/00 |
| 2016/0353464 | A1* | 12/2016 | Kim | H04W 72/12 |
| 2017/0111919 | A1* | 4/2017 | Madan | H04W 72/1273 |
| 2017/0295570 | A1* | 10/2017 | Awad | H04W 4/70 |
| 2018/0013695 | A1* | 1/2018 | Kakadia | H04W 28/24 |
| 2020/0252808 | A1* | 8/2020 | Zhao | H04W 16/32 |
| 2020/0267602 | A1* | 8/2020 | Hashemi | H04W 88/14 |
| 2021/0092753 | A1* | 3/2021 | Choi | H04W 88/08 |
| 2021/0111767 | A1* | 4/2021 | Benjebbour | H04B 7/0417 |

OTHER PUBLICATIONS

European Search Report dated Dec. 9, 2020, issued in European Application No. 19738842.4.

* cited by examiner though the following descriptions.
APPARATUS AND METHOD FOR SCHEDULING IN WIRELESS COMMUNICATION SYSTEM

TECHNICAL FIELD

The present disclosure generally relates to a wireless communication system, and more specifically, to an apparatus and a method for scheduling in the wireless communication system.

BACKGROUND ART

A scheduler in a wireless communication system may perform scheduling to respond to needs of various terminals. The scheduler may determine a scheduling metric for each of the terminals, and schedule a terminal having the highest scheduling metric. In determining the scheduling metric, the scheduler is requested to maximize a throughput for each terminal, and to schedule by considering throughput fairness for all the terminals. In particular, the scheduler is requested to schedule such that each terminal receives a service of good-quality.

DISCLOSURE OF INVENTION

Technical Problem

Based on the discussions described above, the present disclosure provides an apparatus and a method for scheduling in a wireless communication system.

Also, the present disclosure provides an apparatus and a method for performing scheduling by considering quality of experience (QoE) in a wireless communication system.

Also, the present disclosure provides an apparatus and a method for performing scheduling by considering QoE per service or service class in a wireless communication system.

Also, the present disclosure provides an apparatus and a method for controlling scheduling based on a priority corresponding to a service class in a wireless communication system.

Solution to Problem

According to various embodiments of the present disclosure, an operating method of a base station in a wireless communication system includes obtaining at least one value indicating a processing state of data for at least one terminal, and determining a scheduling scheme for the at least one terminal, based on whether the at least one value achieves a target quality level corresponding to the at least one terminal.

According to various embodiments of the present disclosure, an operating method of a base station in a wireless communication system includes measuring at least one value indicating a processing state of data for at least one terminal, transmitting information comprising the at least one value to other node, receiving from the other node, information relating to a scheduling scheme for the at least one terminal, based on whether the at least one value achieves a target quality level corresponding to the at least one terminal, and determining a scheduling scheme for the at least one terminal, by applying the at least one value to the scheduling scheme.

According to various embodiments of the present disclosure, an apparatus of a base station in a wireless communication system includes a control unit for obtaining at least one value indicating a processing state of data for at least one terminal, and determining a scheduling scheme for the at least one terminal, based on whether the at least one value achieves a target quality level corresponding to the at least one terminal.

According to various embodiments of the present disclosure, an apparatus of a base station in a wireless communication system includes a control unit for measuring at least one value indicating a processing state of data for at least one terminal, and a communication unit for transmitting information comprising the at least one value to other node, and receiving from the other node, information relating to a scheduling scheme for the at least one terminal, based on whether the at least one value achieves a target quality level corresponding to the at least one terminal. The control unit determines a scheduling scheme for the at least one terminal, by applying the at least one value to the scheduling scheme.

Advantageous Effects of Invention

An apparatus and a method according to various embodiments of the present disclosure, may adaptively determine a scheduling scheme based on whether quality of experience (QoE) is achieved, and thus increase quality of service which a user actually feels.

Effects obtainable from the present disclosure are not limited to the above-mentioned effects, and other effects which are not mentioned may be clearly understood by those skilled in the art to which the present disclosure belongs to through the following descriptions.

BEST MODE FOR CARRYING OUT THE INVENTION

Terms used in the present disclosure are used for describing particular embodiments and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for scheduling in a wireless communication system. Specifically, the present disclosure explains a technique for adaptively performing the scheduling based on whether quality of experience (QoE) is achieved in the wireless communication system.

Terms indicating signals, terms indicating control information, terms indicating network entities, and terms indicating components of an apparatus, which are used in the following descriptions, are for the sake of explanations. Accordingly, the present disclosure is not limited to the terms to be described, and may use other terms having technically identical meaning.

Figure 1:
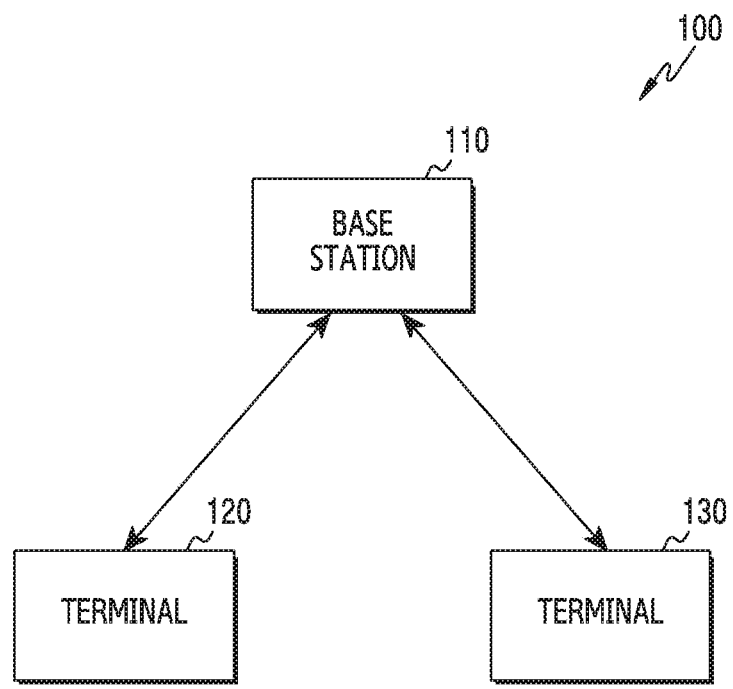
FIG. 1 illustrates a wireless communication system according to various embodiments of the present disclosure.

FIG. 1 illustrates a wireless communication system 100 according to various embodiments of the present disclosure. FIG. 1 depicts a base station 110, a terminal 120, and a terminal 130, as some of nodes which use a radio channel in the wireless communication system 100. While FIG. 1 depicts only one base station, other base station which is identical or similar to the base station 110 may be further included.

The base station 110 is a network infrastructure for providing radio access to the terminals 120 and 130. The base station 110 has coverage defined as a specific geographical area based on a signal transmission distance. The base station 110 may be referred to as, besides the base station, an 'access point (AP)', an 'eNodeB (eNB)', a 'gNodeB (gNB)', a '5th generation node (5G node)', a 'wireless point', a 'transmission/reception point (TRP)', or other terms having technically identical meaning.

According to various embodiments of the present disclosure, the base station may be functionally divided in the wireless communication system 100. For example, the base station may be divided into a base station which controls a plurality of base stations, and a base station which communicates with a terminal via a wireless interface under control of other base station. According to various embodiments of the present disclosure, the base station which controls a plurality of base stations may be referred to as a 'master base station', a 'control base station, a 'central base station', or a 'central unit (CU)', and the base station which communicates with the terminal via the wireless interface under control of other base station may be referred to as a 'slave base station', a 'distributed base station', or a 'distributed unit (DU)'. In this case, the base station 110 may be the central base station or the distributed base station.

The terminal 120 and the terminal 130 each are a device used by a user, and communicate with the base station 110 over a radio channel. In some cases, at least one of the terminal 120 and the terminal 130 may operate without user's involvement. That is, at least one of the terminal 120 and the terminal 130 is a device which performs machine type communication (MTC), and may not be carried by the user. The terminal 120 and the terminal 130 each may be referred to as, besides the terminal, a 'user equipment (UE)', a 'mobile station', a 'subscriber station', a 'remote terminal', a 'wireless terminal', or a 'user device', or other term having a technically equivalent meaning.

To transmit downlink data to a terminal, or to receive uplink data from a terminal in the wireless communication system, the base station (e.g., the base station 110) needs to schedule a plurality of terminals (e.g., the terminal 120, the terminal 130) communicating with the terminal. Since the base station adequately performs the scheduling, quality of service experienced by a user of each terminal may be improved. According to various embodiments of the present disclosure, QoE may be used as an index indicating the service quality experienced by the user of the terminal.

The QoE indicates a quality or a quality level which the user of the terminal actually feels. For example, if the terminal receives a video service (e.g., a video streaming service), the QoE for the terminal may be determined based on a rate at which video stalling occurs. The video stalling may be understood as a phenomenon occurring in a corresponding time duration if a time duration in which a video data amount processed by the terminal is less than a video traffic amount generated for a unit time (e.g., 1 second) is longer than a threshold time duration. As another example, if the terminal receives a web service (e.g., web browsing such as information search, web page switch), the QoE for the terminal may be determined based on a time for which a web page or an image is loaded. As another example, if the terminal receives a voice service (e.g., a circuit switched (CS) call, a voice over internet protocol (VoIP) call), the QoE for the terminal may be determined based on the number of disconnections during a specific time. As another example, if the terminal receives an audio streaming service, the QoE for the terminal may be determined based on the number of audio data disconnections during a specific time. The above-stated basis for determining the QoE is exemplary, and the QoE may be defined based on various bases besides the aforementioned examples.

Since the type of the service (e.g., a web service, a video service, a voice service, an audio streaming service) received by each of scheduling target terminals differs per terminal, each user may have a different quality requirement. In particular, since the user of each terminal is to guarantee the quality (e.g., the QoE) which the user actually feels, it is demanded to perform the scheduling by considering the guarantee of the QoE. Hence, various embodiments of the present disclosure provide an apparatus and a method for performing scheduling by considering QoE.

However, since available radio resources (e.g., time resources, frequency resources) and/or hardware resources of a scheduling device are limited in the wireless communication system, the QoE of all the scheduling target terminals may not be guaranteed. Thus, various embodiments of the present disclosure provide an apparatus and a method for performing scheduling by considering not only QoE, but also a service class of each of the scheduling target terminals. Herein, the service class indicate a scheduling priority for the terminals belonging to the service class. For example, terminals belonging to a high service class may have a high scheduling priority, and terminals belonging to a low service class may have a low scheduling priority. According to various embodiments of the present disclosure, the scheduling priority may be also referred to as a scheduling opportunity, and the terminal of the high scheduling priority may be controlled to have a high scheduling metric. The scheduling target terminals each may belong to one service class of a plurality of service classes according to at least one of a service type received at the terminal and/or a traffic amount generated for the terminal. In other words, although the service types provided to a plurality of terminals are identical, the plurality of the terminals may belong to different service classes according to the traffic amount generated for each terminal. For example, to perform the scheduling by considering the service class, the scheduling may be controlled to restrict the scheduling on terminals belong to a low service class, and to guarantee the QoE for terminals belonging to a high service class. Herein, restricting the scheduling on a specific terminal may indicate controlling the scheduling to decrease the scheduling metric for the terminal.

As described above, various embodiments of the present disclosure provide an apparatus and a method for performing scheduling by considering QoE and/or a service class. Hereafter, a detailed configuration of the base station 110 for performing the scheduling by considering the QoE and/or the service class is explained in FIG. 2.

Figure 2:
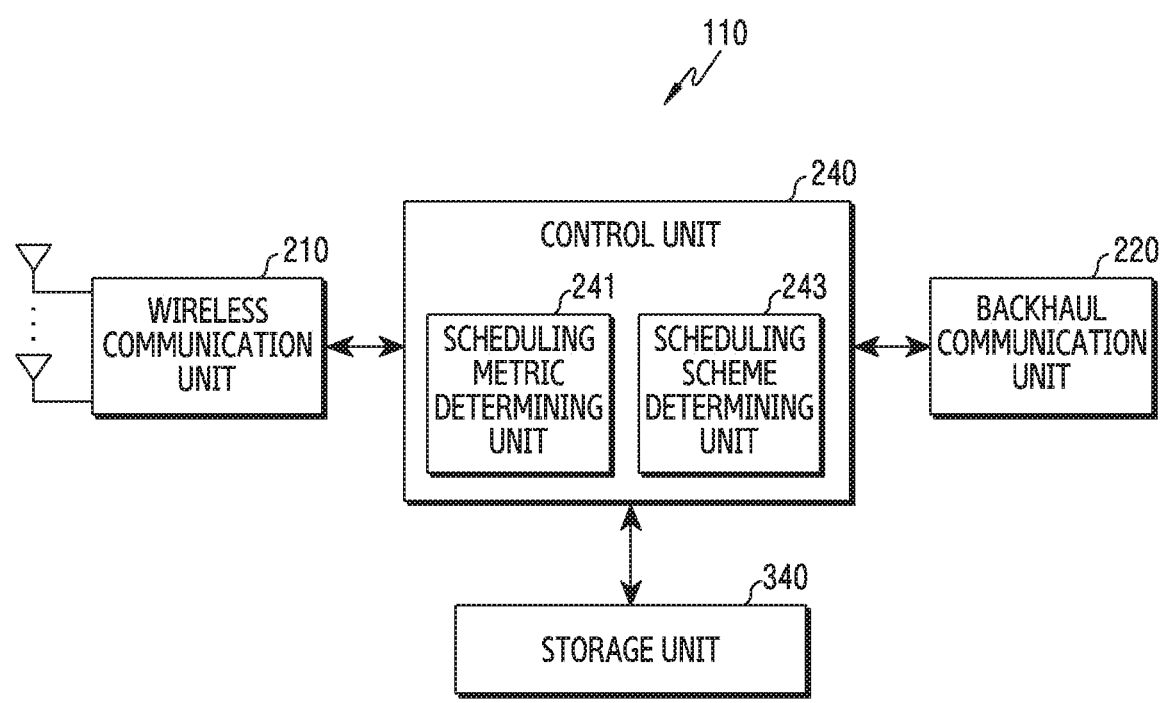
FIG. 2 illustrates a configuration of a base station in wireless communication system according to various embodiments of the present disclosure.

FIG. 2 illustrates a configuration of a base station in wireless communication system according to various embodiments of the present disclosure. The configuration of FIG. 2 may be understood as the configuration of the base station 110. A term such as 'portion' or '~er' used hereafter indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 may perform functions for transmitting and receiving signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal.

Also, the wireless communication unit 210 up-converts the baseband signal to a radio frequency (RF) band signal and then transmits it via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and so on. In addition, the wireless communication unit 210 may include a plurality of transmit and receive paths. Further, the wireless communication unit 210 may include at least one antenna array including a plurality of antenna elements.

In terms of the hardware, the wireless communication unit 210 may include a digital unit and an analog unit, and the analog unit may include a plurality of sub-units according to an operating power and an operating frequency. The digital unit may be implemented with at least one processor (e.g., a digital signal processor (DSP)).

The wireless communication unit 210 transmits and receives the signals as stated above. Hence, whole or part of the wireless communication unit 210 may be referred to as a 'transmitter', a 'receiver', or a 'transceiver'. Also, in the following explanations, the transmission and the reception over the radio channel is used as the meaning which embraces the above-stated processing of the wireless communication unit 210.

The backhaul communication unit 220 provides an interface for communicating with other nodes in a network. That is, the backhaul communication unit 220 converts a bit sting transmitted from the base station to another node, for example, other access node, other base station, an upper node, or a core network, to a physical signal, and converts a physical signal received from the other node to a bit string.

The storage unit 230 stores a basic program for operating the base station, an application program, and data such as setting information. The storage unit 230 may include a volatile memory, a non-volatile memory, or a combination of a volatile memory and a non-volatile memory. The storage unit 230 provides the stored data at a request of the control unit 240.

The control unit 240 controls general operations of the base station. For example, the control unit 240 transmits and receives signals through the wireless communication unit 210 or the backhaul communication unit 220. Also, the control unit 240 records and reads data in and from the storage unit 230. The control unit 240 may execute functions of a protocol stack requested by a communication standard. According to another embodiment, the protocol stack may be included in the wireless communication unit 210. For doing so, the control unit 240 may include at least one processor.

According to various embodiments, the control unit 240 may include a scheduling metric determining unit 241 and/or a scheduling scheme determining unit 243. Herein, the scheduling metric determining unit 241 and/or the scheduling scheme determining unit 243 may be, as an instruction set or code stored in the storage unit 230, instructions/code resided in the control unit 240 at least temporarily or a storage space storing the instructions/code, or part of circuitry of the control unit 240. Functions of the scheduling metric determining unit 241 and/or the scheduling scheme determining unit 243 shall be described in more detail in FIG. 3.

According to various embodiments, the control unit 240 may obtain at least one value indicating a data processing state for at least one terminal, and determine a scheduling scheme for at least one terminal, based on whether at least one value achieves a target quality level corresponding to at least one terminal. Also, according to various embodiments, the control unit 240 may measure at least one value indicating a data processing state for at least one terminal, control the backhaul communication unit 220 to transmit information including at least one value to other node, control the backhaul communication unit 220 to receive from other node information relating to a scheduling scheme for at least one terminal determined based on whether at least one value achieves a target quality level corresponding to at least one terminal, and determine a scheduling metric for at least one terminal, by applying at least one value to the scheduling scheme. For example, the control unit 240 may control the base station to perform operations according to various embodiments to be described.

In FIG. 2, while one base station 110 includes both of the scheduling metric determining unit 241 and the scheduling scheme determining unit 243, which is exemplary, the scheduling metric determining unit 241 and the scheduling scheme determining unit 243 may be implemented in different devices. For example, if the base station 110 is a central base station, the scheduling metric determining unit 241 may be excluded from the configuration of the base station 110 shown in FIG. 2. As another example, if the base station 110 is a distributed base station, the scheduling scheme determining unit 243 may be excluded from the configuration of the base station 110 shown in FIG. 2. If the base station is not functionally divided, the base station 110 may include both of the scheduling metric determining unit 241 and the scheduling scheme determining unit 243 as shown in FIG. 2.

Figure 3:
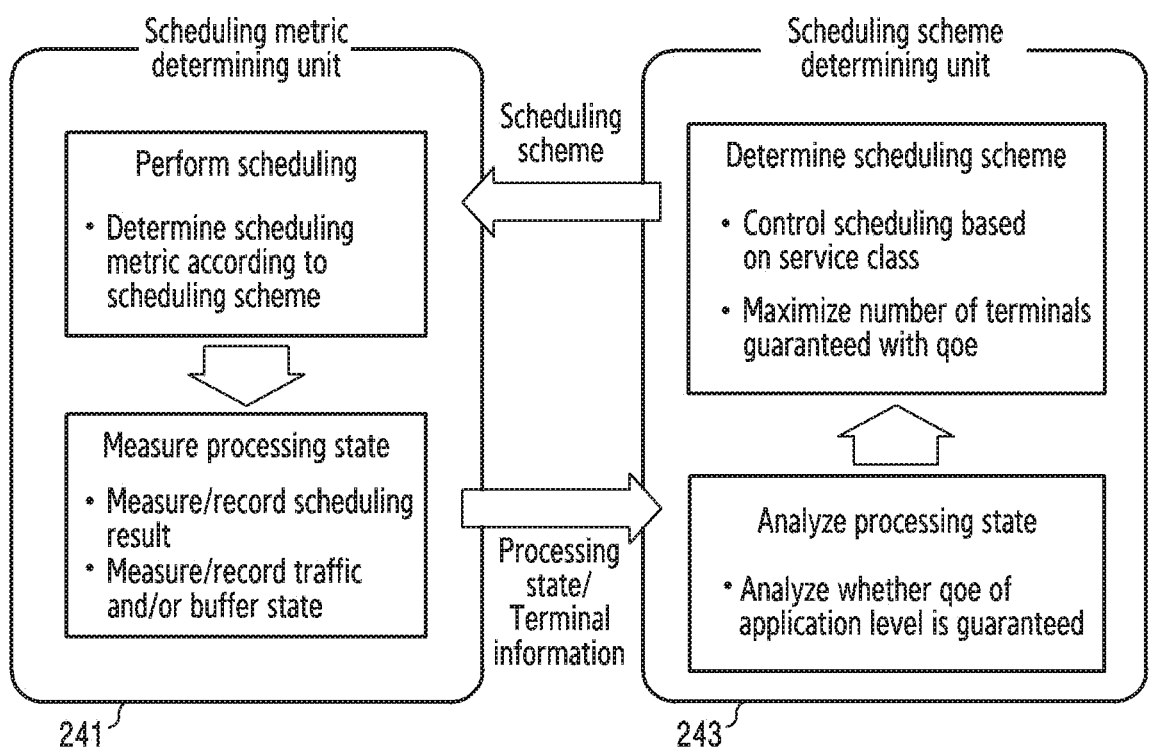
FIG. 3 illustrates functions of a scheduling metric determining unit and a scheduling scheme determining unit in a wireless communication system according to various embodiments of the present disclosure.

Hereafter, detailed functions of the scheduling metric determining unit 241 and the scheduling scheme determining unit 243 are described, in FIG. 3.

FIG. 3 illustrates functions of a scheduling metric determining unit 241 and a scheduling scheme determining unit 2413 in a wireless communication system according to various embodiments of the present disclosure.

The scheduling metric determining unit 241 may perform scheduling. More specifically, the scheduling metric determining unit 241 may determine a scheduling metric for each of scheduling target terminals according to a scheduling scheme determined by the scheduling scheme determining unit 243, and schedule a terminal of the highest scheduling metric.

To determine the scheduling metric, the scheduling metric determining unit 241 may measure a processing state for each terminal. For example, the scheduling metric determining unit 241 may measure and/or record (or, store) traffic and/or buffer state. According to various embodiments of the present disclosure, the processing state may include at least one of an average data rate, a delay, a head-of-line (HoL) delay, an instantaneous data rate, a throughput (or an average throughput), a traffic amount processed until measurement, a traffic amount generated for a unit time (hereafter, referred to as a traffic generation amount), a type of a service related to traffic, a buffer state, and a value determined by a combination of at least two of these variables. Herein, the HoL delay indicates a delay time for a packet first inputted to a buffer in a current buffer, and may be measured with a time elapsed from the input time of the corresponding packet to the buffer to a current time. The buffer state may be determined based on at least one of a traffic amount occupying the buffer, an input time of traffic to the buffer, and a time at which traffic exceeds the buffer.

The processing state may be measured directly after previous scheduling is conducted. Hence, the processing state for each terminal measured by the scheduling metric determining unit 241 may correspond to a scheduling result for each terminal. The scheduling metric determining unit 241 may measure and/or store the scheduling result.

According to various embodiments of the present disclosure, the scheduling metric determining unit 241 may measure the processing state on various time bases. For example, the scheduling metric determining unit 241 may measure the processing state for each hour. As another example, the scheduling metric determining unit 241 may measure the processing state of a preset time unit (e.g., L seconds) at regular time intervals (e.g., T seconds).

The scheduling metric determining unit 241 may provide at least one of information relating to the measured processing state, and information relating to the scheduling target terminal to the scheduling scheme determining unit 243.

The scheduling scheme determining unit 243 analyzes the processing state provided from the scheduling metric determining unit 241. More specifically, the based on the processing state, the scheduling scheme determining unit 243 analyzes whether QoE of an application level is guaranteed, achieved, or satisfied. According to various embodiments of the present disclosure, 'guarantee QoS', 'satisfy QoE' and 'achieve QoE' may have the identical meaning, and may be used exchangeably.

The scheduling scheme determining unit 243 may determine whether the processing state achieves the QoE. According to various embodiments of the present disclosure, whether the QoS is achieved may be determined based on whether the processing state achieves a QoE guarantee condition, or a degree at which the processing state achieves the QoE (hereafter, referred to as an achievement degree).

For example, an example where the scheduling scheme determining unit 243 determines whether the QoE is achieved based on whether the processing state achieves the QoE guarantee condition is shown in the following Table 1.

TABLE 1

| | QoE requirements | the QoE guarantee conditions |
|---|---|---|
| web service terminal | a probability that a web page below 60M bit size is loaded within 30 seconds is over 95% | "an average throughput for a buffer occupancy time" measured every 30 seconds for the web service using terminal witch exceeds 2 Mpbs is over 95% |
| video service using terminal | a probability that stalling does not occur for a video played at 2 Mpbs is over 95% | "an average throughput for a buffer occupancy time" measured every 2 seconds for the video service using terminal which exceeds 2 Mpbs is over 95% |

Referring to Table 1, with respect to a web service using terminal and a video service using terminal, the QoE requirements and the QoE guarantee conditions are different. In other words, the QoE guarantee condition may differ per terminal or per service.

According to Table 1, the QoE requirement for the web service using terminal may be 'a probability that a web page below 60 M bit size is loaded within 30 seconds is over 95%', and the QoE requirement may be satisfied if the QoE guarantee condition is satisfied. For example, if a rate that 'an average throughput for a buffer occupancy time' measured every 30 seconds for the web service using terminal exceeds 2 Mpbs is over 95%, the scheduling scheme determining unit 243 may determine that the data processing state for the web service using terminal has achieved the QoE corresponding to the web service using terminal. For doing so, the scheduling metric determining unit 241 may measure the average throughput of the data during the time for which the data for the web service using terminal occupies the buffer every 30 seconds, and provide information relating to the measured average throughput to the scheduling scheme determining unit 243, and the scheduling scheme determining unit 243 may determine a rate at which the measured average throughput exceeds 2 Mbps, and determine whether the determined rate is over 95%. Herein, the buffer occupancy time and the average throughput are examples of variables indicating the processing state, and variables of other type may be used to determine whether the QoE is guaranteed.

According to Table 1, the QoE requirement for the video service using terminal may be 'a probability that stalling does not occur for a video played at 2 Mpbs is over 95%', and the QoE requirement may be satisfied if the QoE guarantee condition is satisfied. For example, if a rate that 'an average throughput for a buffer occupancy time' measured every 2 seconds for the video service using terminal exceeds 2 Mpbs is over 95%, the scheduling scheme determining unit 243 may determine that the data processing state for the video service using terminal has achieved the QoE corresponding to the video service using terminal. For doing so, the scheduling metric determining unit 241 may measure the average throughput of the data during the time for which the data for the video service using terminal occupies the buffer every 2 seconds, and provide information relating to the measured average throughput to the scheduling scheme determining unit 243, and the scheduling scheme determining unit 243 may determine a rate at which the measured average throughput exceeds 2 Mbps, and determine whether the determined rate is over 95%. Herein, the buffer occupancy time and the average throughput are examples of the variables indicating the processing state, and variables of other type may be used to determine whether the QoE is guaranteed.

As another example, an example where the scheduling scheme determining unit 243 determines whether the QoE is achieved based on the degree at which the processing state achieves the QoE is shown in the following Table 2.

the data during the time for which the data for the web service using terminal occupies the buffer every 30 seconds, and provide information relating to the measured average throughput to the scheduling scheme determining unit 243, and the scheduling scheme determining unit 243 may determine a rate at which the measured average throughput exceeds 2 Mbps. Herein, the buffer occupancy time and the average throughput are examples of the variables indicating the processing state, and variables of other type may be used to determine whether the QoE is guaranteed.

As another example, the QoE achievement degree for the video service using terminal may be expressed as a 'rate at which the "average throughput for the buffer occupancy time" measured every 2 seconds exceeds 2 Mbps'. If a current QoE achievement degree for the video service using terminal increases from a previous QoE achievement degree, the scheduling scheme determining unit 243 may determine that the data processing state for the video service using terminal has achieved the QoE corresponding to the video service using terminal. For doing so, the scheduling metric determining unit 241 may determine the average throughput of the data during the time for which the data for the video service using terminal occupies the buffer every 2 seconds, and provide information relating to the measured average throughput to the scheduling scheme determining unit 243, and the scheduling scheme determining unit 243 may determine a rate at which the measured average throughput exceeds 2 Mbps. Herein, the buffer occupancy time and the average throughput are examples of the variables indicating the processing state, and variables of other type may be used to determine whether the QoE is guaranteed.

In Table 1 and Table 2, the QoE requirement, the QoE guarantee condition and the QoE achievement degree for each terminal are exemplary, and the QoE requirement, the QoE guarantee condition and the QoE achievement degree for each terminal may set differently from Table 1 and Table 2. In addition, the QoE requirement, the QoE guarantee condition and the QoE achievement degree for a terminal which uses a service of other type (e.g., a voice service, an audio streaming service) may be also set, as well as the web service using terminal and the video service using terminal.

TABLE 2

| | QoE requirements | the QoE guarantee conditions |
|---|---|---|
| web service terminal | a probability that a web page below 60M bit size is loaded within 30 seconds is over 95% | a rate at which the "average throughput for the buffer occupancy time" measured every 30 seconds exceeds 2 Mbps |
| video service using terminal | a probability that stalling does not occur for a video played at 2 Mpbs is over 95% | a rate at which the "average throughput for the buffer occupancy time" measured every 2 seconds exceeds 2 Mbps |

For example, the QoE achievement degree for the web service using terminal may be expressed as a 'rate at which the "average throughput for the buffer occupancy time" measured every 30 seconds exceeds 2 Mbps'. If a current QoE achievement degree for the web service using terminal increases from a previous QoE achievement degree, the scheduling scheme determining unit 243 may determine that the data processing state for the web service using terminal has achieved the QoE corresponding to the web service using terminal. For doing so, the scheduling metric determining unit 241 may determine the average throughput of After determining whether the processing state achieves the QoE, the scheduling scheme determining unit 243 determines a scheduling scheme. That is, the scheduling scheme determining unit 243 may determine the scheduling scheme, based on whether the processing state achieves the QoE.

According to various embodiments of the present disclosure, the scheduling scheme may be determined based on at least one of a scheduling rule and a scheduling parameter. The scheduling rule may be expressed as a type of variables for determining the scheduling metric and a relation of the variables. Herein, the variables for determining the scheduling metric may include at least one of the variables indicating the processing state (e.g., the average data rate, the delay, the HoL delay, the instantaneous data rate, the throughput, the traffic amount processed until the measurement, the traffic generation amount, the service type related to the traffic, the buffer state). The scheduling parameter may include at least one of a reference value (or, a threshold value) for determining whether at least one variable for determining the scheduling metric satisfies a specific condition), or a weight applied to at least one variable for determining the scheduling metric or a combination of variables.

For example, the scheduling scheme may be determined based on the following Equation 1.

$$\text{scheduling rule:} \begin{cases} \dfrac{\text{current transmission capacity}}{\text{average throughput in recent } A \text{ seconds}} \times C & \text{if } \left(\begin{array}{c}\text{average throughput in}\\ \text{recent } A \text{ seconds}\end{array}\right) \leq B \\ \dfrac{\text{current transmission capacity}}{\text{average throughput in recent } A \text{ seconds}} & \text{otherwise} \end{cases} \quad \text{Equation 1}$$

schedule parameters $A = 15, B = 2, C = 100$

In Equation 1 and the following present disclosure, 'recent' means a previous specific time duration in the measurement. In addition, 'current transmission capacity' means a maximum amount of data transmittable by the base station for a unit time (e.g., 1 second), and may be determined based on a channel state and/or a channel quality between the base station and the terminal. If a measurement value of a variable related to the scheduling scheme is applied to the scheduling scheme, the scheduling metric may be determined. For example, if the scheduling scheme for the terminal is Equation 1, the scheduling metric determining unit 241 may measure the average throughput of the data for the terminal and the current transmission capacity of the base station in recent 15 seconds, apply the measured values to the scheduling scheme of Equation 1, and thus determine the scheduling metric for the terminal.

If the data processing state for the terminal does not achieve the QoE corresponding to the terminal, the scheduling scheme determining unit 243 may determine the scheduling scheme to increase a scheduling opportunity for the terminal. For example, if the data processing state for the terminal does not achieve the QoE corresponding to the terminal, the scheduling scheme determining unit 243 may determine the scheduling scheme by decreasing the value of the parameter A and increasing the values of the parameters B and C in Equation 1. By contrast, if the data processing state for the terminal achieves the QoE corresponding to the terminal, the scheduling scheme determining unit 243 may determine the scheduling scheme to maintain or reduce the scheduling opportunity for the terminal. For example, if the data processing state for the terminal achieves the QoE corresponding to the terminal, the scheduling scheme determining unit 243 may determine the scheduling scheme by maintaining or increasing the value of the parameter A, and maintaining or decreasing the values of the parameters B and C in Equation 1.

As another example, the scheduling scheme may be determined based on the following Equation 2.

$$\text{scheduling rule:} \begin{cases} \dfrac{\text{HoL delay}}{\text{maximum delay budget}} \times B & \text{if } (\text{HoL delay}) \leq A \\ \dfrac{\text{HoL delay}}{\text{maximum delay budget}} & \text{otherwise} \end{cases} \quad \text{Equation 2}$$

scheduling parameters $A = 2, B = 100$

In Equation 2 and the following present disclosure, 'maximum delay budget (DB)' means a maximum time of the delay allowed at least to satisfy a quality of a specific service.

For example, if the scheduling scheme for the terminal is Equation 2, the scheduling metric determining unit 241 may measure the maximum DB of the data for the terminal and the HoL delay, apply the measured values to the scheduling scheme of Equation 2, and thus determine the scheduling metric for the terminal. If the data processing state for the terminal does not achieve the QoE corresponding to the terminal, to increase the scheduling opportunity for the terminal, the scheduling scheme determining unit 243 may determine the scheduling scheme by increasing the parameter A and B values in Equation 2. By contrast, if the data processing state for the terminal achieves the QoE corresponding to the terminal, to maintain or decrease the scheduling opportunity for the terminal, the scheduling scheme determining unit 243 may determine the scheduling scheme by decreasing the parameter A and B values in Equation 2.

As another example, the scheduling scheme may be determined based on the following Equation 3.

$$\text{scheduling rule:} \dfrac{\text{target throughput}(=B)}{(\text{average throughput in recent } A \text{ seconds})^{\alpha}} \times \dfrac{\text{current transmission capacity}}{\text{average transmission capacity}} \quad \text{Equation 3}$$

scheduling parameters $A = 15, B = 2, \alpha = 1$

In Equation 3 and the following present disclosure, 'target throughput' denotes an average throughput expected to satisfy the quality of the specific service, and may be set by the base station per service, or may be set by a network. In addition, 'average transmission capacity' indicates an average value of transmission capacities including the current transmission capacity and measured for a specific time.

For example, if the scheduling scheme for the terminal is Equation 3, the scheduling metric determining unit 241 may measure the current transmission capacity, the average transmission capacity and the average throughput in recent 15 seconds, apply the measured values to the scheduling scheme of Equation 3, and thus determine the scheduling metric for the terminal. If the data processing state for the terminal does not achieve the QoE corresponding to the terminal, to increase the scheduling opportunity for the terminal, the scheduling scheme determining unit 243 may determine the scheduling scheme by decreasing the parameter A and a values and increasing the parameter B value in Equation 3. By contrast, if the data processing state for the terminal achieves the QoE corresponding to the terminal, to maintain or decrease the scheduling opportunity for the terminal, the scheduling scheme determining unit 243 may determine the scheduling scheme by increasing the parameter A and a values and decreasing the parameter B value in Equation 3.

As another example, the scheduling scheme may be determined based on the following Equation 4.

$$\text{scheduling rule:} \begin{cases} \dfrac{\text{current transmsision capacity}}{\text{average throughput in recent } A \text{ seconds}} \times C & \text{if (service delay time)} \leq B \\ \dfrac{\text{current transmsision capacity}}{\text{average throughput in recent } A \text{ seconds}} & \text{otherwise} \end{cases} \quad \text{Equation 4}$$

scheduling parameters $A = 15, B = 15, C = 100$

In Equation 4 and the following present disclosure, 'service delay time' means an elapsed time until a packet initially inputted to the buffer leaves the buffer in a bundle of packets for a specific service, and may be referred to as 'delay of the application level', or 'delay of the service level'. For example, if packets are continually generated at time intervals smaller than preset time intervals, a series of the generated packets may be regarded as being related to a particular service, and the bundle of the packets may be defined as a 'bundle of packets for the service'. According to various embodiments of the present disclosure, 'bundle of packets for the service' may be briefly referred to as 'data for the service'. In addition, 'data for the service' may be understood as data for at least one terminals which use the corresponding service.

If the scheduling scheme for the terminal is Equation 4, the scheduling metric determining unit 241 may measure the current transmission capacity, the average throughput of the data for the service in recent 15 seconds and the service delay time, apply the measured values to the scheduling scheme of Equation 4, and thus determine the scheduling metric for the terminal. If the scheduling result does not achieve the QoE, to increase the scheduling opportunity for the terminals using the service, the scheduling scheme determining unit 243 may determine the scheduling scheme by decreasing the parameter A value and increasing the parameter B and C values in Equation 4. By contrast, if the scheduling result achieves the QoE, to maintain or decrease the scheduling opportunity for the terminals using the service, the scheduling scheme determining unit 243 may determine the scheduling scheme by maintaining or increasing the parameter A value and maintaining or decreasing the parameter B and C values in Equation 4.

As another example, the scheduling scheme may be determined based on the following Equation 5.

$$\text{scheduling rule:} \dfrac{(\text{service delay time})^{\alpha}}{\text{target service delay time}(=A)} \times \quad \text{Equation 5}$$

$$\dfrac{\text{current transmission capacity}}{\text{average transmission capacity}}$$

scheduling parameters $A = 15, \alpha = 1$

In Equation 5 and the following present disclosure, 'target service delay time' means a service delay time expected to satisfy a quality of a particular service, and may be set by the base station per service, or may be set by the network.

For example, if the scheduling scheme for the terminal is Equation 5, the scheduling metric determining unit 241 may measure the current transmission capacity, the average transmission capacity and the service delay time, apply the measured values to the scheduling scheme of Equation 5, and thus determine the scheduling metric. If the scheduling result does not achieve the QoE, to increase the scheduling opportunity for the terminals using the service, the scheduling scheme determining unit 243 may determine the scheduling scheme by increasing the parameter A value and increasing the parameter a value in Equation 5. By contrast, if the scheduling result achieves the QoE, to maintain or decrease the scheduling opportunity for the terminals using the service, the scheduling scheme determining unit 243 may determine the scheduling scheme by increasing the parameter A value and decreasing the parameter a value in Equation 5.

The scheduling schemes in Equation 1 through Equation 5 are exemplary, and the scheduling rule, the scheduling parameter value and the type may change variously.

As stated above, the scheduling scheme determining unit 243 may determine the scheduling scheme based on whether the data processing state for the terminal achieves the QoE. Thus, the scheduling scheme determining unit 243 may determine the scheduling scheme which maximizes the number of terminals guaranteed with the QoE. In addition, according to various embodiments of the present disclosure, if all the terminals may not be guaranteed with the QoE, the scheduling scheme determining unit 243 may determine the scheduling scheme to control the scheduling based on a service class of the terminals. An example of a method for controlling the scheduling based on the service class shall be described in detail in FIG. 8.

The scheduling scheme determining unit 243 may provide the determined scheduling scheme to the scheduling metric determining unit 241, so that the scheduling metric determining unit 241 may determine the scheduling metric according to the scheduling scheme. More specifically, the scheduling metric determining unit 241 may determine the scheduling metric for each terminal, by measuring the data processing state for each terminal and applying values of variables related to the scheduling scheme among the measured values to the scheduling scheme.

For example, with respect to the web service using terminal and the video service use terminal, the scheduling metric may be determined based on the following Table 3.

TABLE 3

| QoE requirements | | Service class | Scheduling metric *scheduling parameter: $(A_1, A_2, B_1, B_2, C_1, C_2) = (15, 1, 2, 2, 100, 100)$ |
|---|---|---|---|
| web service using terminal | a probability that a web page below 60M bit size is loaded within 30 seconds is over 95% | 2 | scheduling metric $\begin{cases} \dfrac{\text{current transmission capacity}}{\text{average throughput in recent } A_1 \text{ seconds}} \times C & \text{if} \left( \dfrac{\text{average throughput in}}{\text{recent } A_1 \text{ seconds}} \right) \leq B_1 \\ \dfrac{\text{current transmission capacity}}{\text{average throughput in recent } A_1 \text{ seconds}} & \text{otherwise} \end{cases}$ |
| video service using terminal | a probability that stalling does not occur for a video played at 2Mpbs is over 95% | 1 | scheduling metric $\begin{cases} \dfrac{\text{current transmission capacity}}{\text{average throughput in recent } A_2 \text{ seconds}} \times C & \text{if} \left( \dfrac{\text{average throughput in}}{\text{recent } A_2 \text{ seconds}} \right) \leq B_2 \\ \dfrac{\text{current transmission capacity}}{\text{average throughput in recent } A_2 \text{ seconds}} & \text{otherwise} \end{cases}$ |

Referring to Table 3, the scheduling parameter $A_1$ (=15) for the web service using terminal, and the scheduling parameter $A_2$ (=1) for the video service using terminal are different. In other words, the scheduling scheme may differ per terminal According to Table 3, the video service using terminal may belong to a higher service class than the web service using terminal. In other words, the scheduling scheme may be determined such that the scheduling opportunity for the video service using terminal is higher than the web service using terminal. In Table 3, since the scheduling parameter $A_2$ (=1) for the video service using terminal is set to be smaller than the scheduling parameter $A_1$ (=15) for the web service using terminal, the scheduling opportunity for the video service using terminal may be higher than the scheduling opportunity for the web service using terminal.

As another example, with respect to the web service using terminal and the video service use terminal, the scheduling metric may be determined as shown in the following Table 4.

TABLE 4

| QoE requirements | | Service class | Scheduling metric *scheduling parameter: $(A_1, A_2, B_1, B_2, \alpha) = (15, 1, 2, 2, 1)$ |
|---|---|---|---|
| web service using terminal | a probability that a web page below 60M bit size is loaded within 30 seconds is over 95% | 2 | scheduling metric $\dfrac{\text{target throughput} (=B_1)}{(\text{average throughput in recent } A_1 \text{ seconds})^\alpha} \times \dfrac{\text{current transmission capacity}}{\text{average transmission capacity}}$ |
| video service using terminal | a probability that stalling does not occur for a video played at 2Mpbs is over 95% | 1 | scheduling metric $\dfrac{\text{target throughput} (=B_2)}{(\text{average throughput in recent } A_2 \text{ seconds})^\alpha} \times \dfrac{\text{current transmission capacity}}{\text{average transmission capacity}}$ |

According to Table 4, the video service using terminal may belong to a higher service class than the web service using terminal. In Table 4, since the scheduling parameter $A_2$ (=1) for the video service using terminal is set to be smaller than the scheduling parameter $A_1$ (=15) for the web service using terminal, the scheduling opportunity for the video service using terminal may be higher than the scheduling opportunity for the web service using terminal.

As another example, with respect to the web service using terminal and the video service use terminal, the scheduling metric may be determined as shown in the following Table 5

TABLE 5

| QoE requirements | | Service class | Scheduling metric *scheduling parameter: $(A_1, A_2, B_1, B_2, C_1, C_2) = (15, 1, 15, 1, 100, 100)$ |
|---|---|---|---|
| web service using terminal | a probability that a web page below 60M bit size is loaded within 30 seconds is over 95% | 2 | scheduling metric $\begin{cases} \dfrac{\text{current transmission capacity}}{\text{average throughput in recent } A_1 \text{ seconds}} \times C_1 & \text{if service delay} \leq B_1 \\ \dfrac{\text{current transmission capacity}}{\text{average throughput in recent } A_1 \text{ seconds}} & \text{otherwise} \end{cases}$ |

TABLE 5-continued

| QoE requirements | Service class | Scheduling metric *scheduling parameter: $(A_1, A_2, B_1, B_2, C_1, C_2) = (15, 1, 15, 1, 100, 100)$ |
|---|---|---|
| video service using terminal — a probability that stalling does not occur for a video played at 2Mpbs is over 95% | 1 | scheduling metric $\begin{cases} \dfrac{\text{current transmission capacity}}{\text{average throughput in recent } A_2 \text{ seconds}} \times C_2 & \text{if service delay} \leq B_2 \\ \dfrac{\text{current transmission capacity}}{\text{average throughput in recent } A_2 \text{ seconds}} & \text{otherwise} \end{cases}$ |

According to Table 5, the video service using terminal may belong to a higher service class than the web service using terminal. In Table 5, since the scheduling parameter $A_2$ (=1) for the video service using terminal is set to be smaller than the scheduling parameter $A_1$ (=15) for the web service using terminal, the scheduling opportunity for the video service using terminal may be higher than the scheduling opportunity for the web service using terminal.

As another example, with respect to the web service using terminal and the video service use terminal, the scheduling metric may be determined as shown in the following Table 6.

TABLE 6

| QoE requirements | Service class | Scheduling metric *scheduling parameter: $(A_1, A_2, \alpha) = (15, 1, 2, 2, 1)$ |
|---|---|---|
| web service using terminal — a probability that a web page below 60M bit size is loaded within 30 seconds is over 95% | 2 | scheduling metric $\dfrac{(\text{service delay time})^\alpha}{\text{target delay time } (=A_1)} \times \dfrac{\text{current transmission capacity}}{\text{average transmission capacity}}$ |
| video service using terminal — a probability that stalling does not occur for a video played at 2Mpbs is over 95% | 1 | scheduling metric $\dfrac{(\text{service delay time})^\alpha}{\text{target delay time } (=A_2)} \times \dfrac{\text{current transmission capacity}}{\text{average transmission capacity}}$ |

According to Table 6, the video service using terminal may belong to a higher service class than the web service using terminal. In Table 6, since the scheduling parameter $A_2$ (=1) for the video service using terminal is set to be smaller than the scheduling parameter $A_1$ (=15) for the web service using terminal, the scheduling opportunity for the video service using terminal may be higher than the scheduling opportunity for the web service using terminal.

Figure 4:
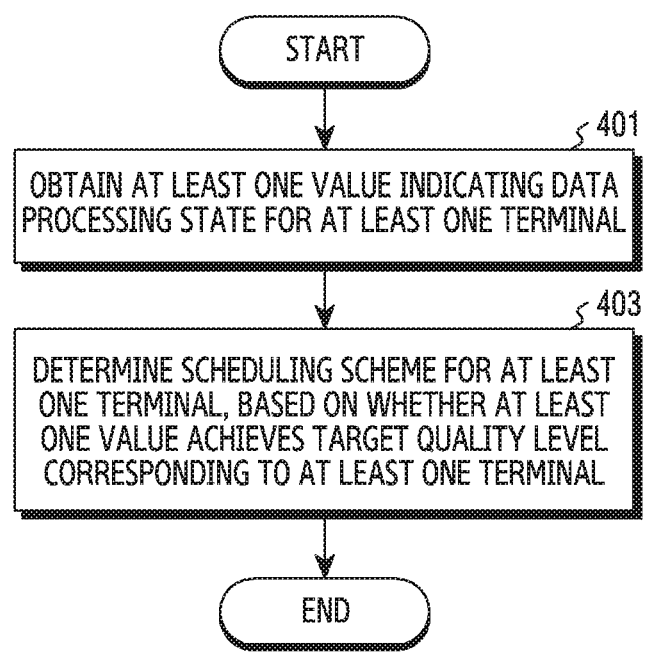
FIG. 4 illustrates a flowchart of a base station for determining a scheduling scheme in a wireless communication system according to various embodiments of the present disclosure.
Figure 5:
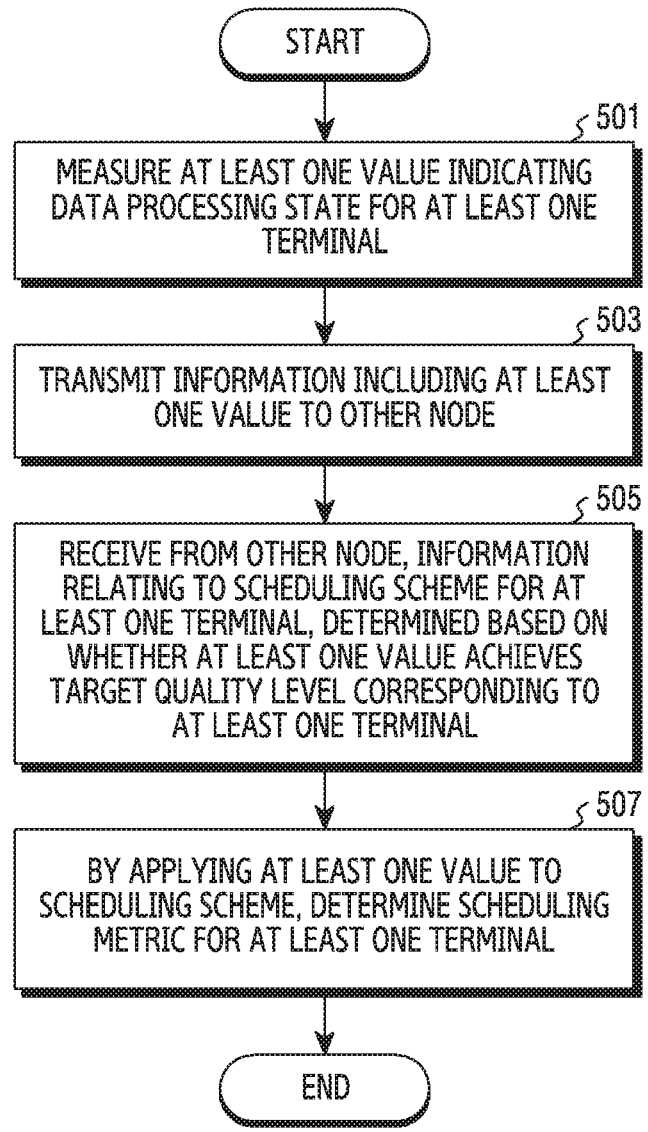
FIG. 5 illustrates a flowchart of a base station for determining a scheduling metric in a wireless communication system according to various embodiments of the present disclosure.

Now, specific operations for determining the scheduling scheme and the scheduling metric are described in FIG. 4 and FIG. 5.

FIG. 4 illustrates a flowchart of a base station for determining a scheduling scheme in a wireless communication system according to various embodiments of the present disclosure. FIG. 4 illustrates operations of the base station 110.

Referring to FIG. 4, in step 401, the base station obtains at least one value indicating a data processing state of at least one terminal. For example, the at least one terminal may be terminal(s) belonging to the same service class, or using the same service. As another example, the at least one terminal may be a single terminal irrelevant to a service and/or a service class. In other words, according to various embodiments of the present disclosure, the data processing state for at least one terminal may be defined per terminal, per service, or per service class. The at least one value indicating the processing state may be at least one value among various variables indicating the processing state. According to various embodiments of the present disclosure, the at least one value indicating the processing state may be referred in brief to as the processing state.

According to various embodiments of the present disclosure, the base station of FIG. 4 may be a central base station. In this case, a distributed base station may measure at least one value indicating the data processing state for at least one terminal, and the central base station may receive a measurement value from the distributed base station.

According to various embodiments of the present disclosure, the base station may not be functionally divided. In this case, the base station may measure at least one value indicating the data processing state for at least one terminal.

In step 403, the base station may determine a scheduling scheme for at least one terminal, based on whether the at least one value achieves a target quality level corresponding to at least one terminal. Herein, the target quality level may include QoE. In other words, based on whether the at least one value achieves QoE corresponding to at least one terminal, the base station may determine the scheduling scheme for at least one terminal. In addition, as mentioned earlier, at least one terminal may be terminal(s) belonging to the same service class, or using the same service, or a single terminal irrelevant to the service and/or the service class. Hence, the target quality level corresponding to at least one terminal may be defined per terminal, per service, or per service class.

According to various embodiments of the present disclosure, the base station of FIG. 4 may be a central base station. In this case, the base station may provide the determined scheduling scheme to a distributed base station, and the distributed base station may determine a scheduling metric according to the scheduling scheme.

According to various embodiments of the present disclosure, the base station may not be functionally divided. In this case, the base station may determine the scheduling metric for at least one terminal, by applying at least one value to the determined scheduling scheme.

FIG. 5 illustrates a flowchart of a base station for determining a scheduling metric in a wireless communication system according to various embodiments of the present disclosure. FIG. 5 illustrates operations of the base station 110. In FIG. 5, the base station may be a distributed base station.

Referring to FIG. 5, in step 501, the base station measures at least one value indicating a data processing state for at least one terminal. For example, the base station may measure at least one value of variables (e.g., an average data rate, a delay, a HoL delay, an instantaneous data rate, a throughput, a traffic amount processed until measurement, a traffic generation amount, a type of a service related to traffic, a buffer state, and a combination of at least two of these variables) indicating the processing state.

In step 503, the base station transmits information including at least one value to other node. Herein, the other node may include a central base station. At least one value may be used for the other node to determine a scheduling scheme.

In step 505, the base station may receive from the other node, information relating to the scheduling scheme for at least one terminal. The scheduling scheme for at least one terminal may be determined, by the other node, based on whether at least one value transmitted in step 503 achieves a target quality level. For example, the target quality level may include QoE. The base station may receive the scheduling scheme information determined by the other node from the other node.

In step 507, by applying at least one value to the scheduling scheme, the base station may determine a scheduling metric for at least one terminal. According to various embodiments of the present disclosure, the processing state measured to determine the scheduling scheme in step 501, and the processing state measured to determine the scheduling metric in step 507 may be different, and may be measured at different times. In addition, after determining the scheduling metric, the base station may transmit a scheduling result to the other node, to update (or, maintain) the scheduling scheme by the other node.

In the following FIG. 6, specific operations for determining whether the data processing state for the terminal achieves the target quality level are explained.

Figure 6:
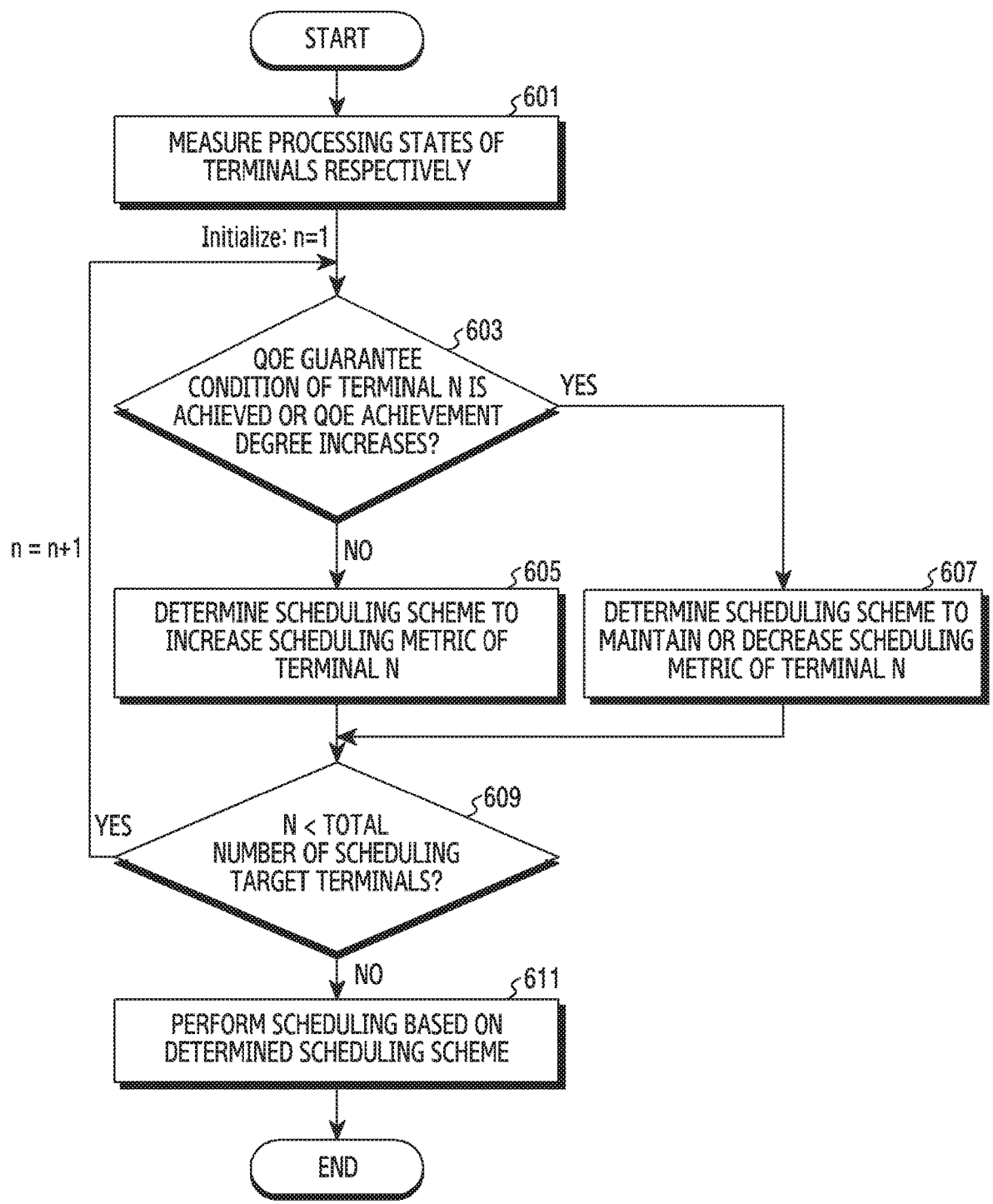
FIG. 6 illustrates a flowchart of a base station for determining a scheduling scheme based on whether quality of experience (QoE) is guaranteed in a wireless communication system according to various embodiments of the present disclosure.

FIG. 6 illustrates a flowchart of a base station for determining a scheduling scheme based on whether QoE is guaranteed in a wireless communication system according to various embodiments of the present disclosure. FIG. 6 illustrates operations of the base station 110.

Referring to FIG. 6, in step 601, the base station measures processing states of terminals respectively. For example, if the total number of scheduling target terminals is N, the base station may measure the processing state of the terminal n (n=1, 2, . . . , N).

In step 603, by starting from the terminal 1, the base station determines whether a QoE guarantee condition of the terminal n is achieved or whether a QoE achievement degree of the terminal n increases. In other words, the base station determines whether the target quality level or the QoE for the terminal n is achieved. The base station determines whether the data processing state for the terminal n achieves the QoE guarantee condition corresponding to the terminal n. Alternatively, the base station may determine a degree at which the data processing state for the terminal n achieves the QoE corresponding to the terminal n, and determine whether a current achievement degree increases from a previous achievement degree.

If the QoE guarantee condition of the terminal n is not achieved, or if the QoE achievement degree of the terminal n does not increase, in step 605, the base station determines a scheduling scheme for the terminal n to increase a scheduling metric of the terminal n. For example, the base station may adjust a scheduling parameter to be applied to the terminal n to increase a scheduling opportunity for the terminal n.

If the QoE guarantee condition of the terminal n is achieved, or if the QoE achievement degree of the terminal n increases, in step 607, the base station determines a scheduling scheme for the terminal n to maintain or decrease the scheduling metric of the terminal n. For example, the base station may adjust a scheduling parameter to be applied to the terminal n to maintain or decrease the scheduling opportunity for the terminal n.

According to step 605 and step 607, the base station may adjust the scheduling opportunity for the terminal n by considering whether the QoE achievement degree of the terminal n has increased or decreased. In so doing, the base station may further consider a degree at which the QoE of the terminal n changes (i.e., a difference between a current QoE achievement degree and a previous QoE achievement degree). For example, if the QoE achievement degree of the terminal n increases and the difference between the current QoE achievement degree and the previous QoE achievement degree (an increase of the QoE achievement degree) is small, the base station may determine the scheduling scheme for the terminal n to maintain or less decrease the scheduling opportunity for the terminal n. As another example, if the QoE achievement degree of the terminal n increases and the difference between the current QoE achievement degree and the previous QoE achievement degree (the increase of the QoE achievement degree) is great, the base station may determine the scheduling scheme for the terminal n to considerably decrease the scheduling opportunity for the terminal n. As another example, if the QoE achievement degree of the terminal n decreases and the difference between the current QoE achievement degree and the previous QoE achievement degree (the increase of the QoE achievement degree) is small, the base station may determine the scheduling scheme for the terminal n to less increase the scheduling opportunity for the terminal n. As another example, if the QoE achievement degree of the terminal n decreases and the difference between the current QoE achievement degree and the previous QoE achievement degree (the increase of the QoE achievement degree) is great, the base station may determine the scheduling scheme for the terminal n to considerably increase the scheduling opportunity for the terminal n.

In step 609, the base station determines whether n is smaller than the total number N of scheduling target terminals. In other words, the base station determines whether the scheduling scheme has been determined for all the scheduling target terminals. If n is smaller than the total number N of the scheduling target terminals (i.e., if there remains a terminal for which the scheduling scheme is not determined), the base station returns to step 603, and performs operation of step 603 and subsequent steps.

If n is greater than or equal to the total number N of the scheduling target terminals (i.e., if the scheduling scheme has been determined for all the scheduling target terminals), in step 611, the base station performs the scheduling based on the determined scheduling scheme. The base station may determine the scheduling metric for each terminal based on the scheduling scheme for each terminal, and schedule the terminal of the highest scheduling metric.

In FIG. 6, the example where the data processing state for each terminal is measured, and the scheduling scheme is determined based on whether the measured processing state achieves the QoE corresponding to each terminal has been described. In other words, the method for determining the scheduling scheme if the data processing state and the QoE are defined per terminal have been described in FIG. 6. However, according to various embodiments of the present disclosure, the data processing state and the QoE may be defined per service, or per service class. For example, if the data processing state and the QoE are defined per service, the base station may measure the data processing state for all terminals which use each service, determine the scheduling scheme for a corresponding service based on whether the measured processing state satisfies the QoE corresponding to the service, and determine the scheduling metric for all the terminals respectively using the corresponding service based on the determined scheduling scheme. Herein, 'data relating to all the terminals which use the service' may be whole data of aggregated data for each terminal. In other words, if the data processing state and the QoE are defined per service, the same scheduling scheme may be applied to all the terminals using the same service. As another example, if the data processing state and the QoE are defined per service class, the base station may measure the data processing state for all terminals belonging to each service class, determine the scheduling scheme for the service class based on whether the measured processing state satisfies the QoE corresponding to the service class, and determine the scheduling metric for all the terminals respectively belonging to the corresponding service class based on the determined scheduling scheme. Herein, 'data relating to all the terminals belonging to the service class' may be whole data of aggregated data for each terminal belonging to the service class. In other words, if the data processing state and the QoE are defined per service class, the same scheduling scheme may be applied to all the terminals belonging to the same service class.

According to various embodiments of the present disclosure, whether the QoE is achieved may be affected by a change of the number of the terminals which use the service. For example, whether the QoE is achieved in relation to each of a current web service using terminal and a video service using first terminal may be given as the following Table 7.

TABLE 7

| | whether a QoE guarantee condition is achieved (QoE achievement degree) | | Scheduling metric *scheduling parameter: $(A_1, A_2, B_1, B_2, C_1, C_2) = (15, 1, 2, 2, 100, 100)$ |
|---|---|---|---|
| web service using terminal | O (100%) | scheduling metric | $\begin{cases} \frac{\text{current transmission capacity}}{\text{average throughput in recent } A_1 \text{ seconds}} \times C_1 & \text{if} \left( \frac{\text{average throughput in}}{\text{recent } A_1 \text{ seconds}} \right) \leq B_1 \\ \frac{\text{current transmission capacity}}{\text{average throughput in recent } A_1 \text{ seconds}} & \text{otherwise} \end{cases}$ |
| video service using terminal | O (100%) | scheduling metric | $\begin{cases} \frac{\text{current transmission capacity}}{\text{average throughput in recent } A_2 \text{ seconds}} \times C_2 & \text{if} \left( \frac{\text{average throughput in}}{\text{recent } A_2 \text{ seconds}} \right) \leq B_2 \\ \frac{\text{current transmission capacity}}{\text{average throughput in recent } A_2 \text{ seconds}} & \text{otherwise} \end{cases}$ |

Referring to Table 7, the QoE is guaranteed for the web service using terminal and the video service using first terminal, the scheduling parameter for the web service using terminal is {A1, B1, C1}={15, 2, 100}, and the scheduling parameter for the video service using first terminal is {A2, B2, C2}={1, 2, 100}. In so doing, if a second terminal newly uses the video service, and the same scheduling parameter {A2, B2, C2}={1, 2, 100} as before is applied to the terminals using the video service, whether the QoE is guaranteed for each of the web service using terminal, the video service using first terminal and the video service using second terminal may be given as the following Table 8.

TABLE 8

| | whether a QoE guarantee condition is achieved (QoE achievement degree) | | Scheduling metric *scheduling parameter: $(A_1, A_2, B_1, B_2, C_1, C_2) = (15, 1, 2, 2, 100, 100)$ |
|---|---|---|---|
| web service using terminal | O (100%) | scheduling metric | $\begin{cases} \frac{\text{current transmission capacity}}{\text{average throughput in recent } A_1 \text{ seconds}} \times C_1 & \text{if} \left( \frac{\text{average throughput in}}{\text{recent } A_1 \text{ seconds}} \right) \leq B_1 \\ \frac{\text{current transmission capacity}}{\text{average throughput in recent } A_1 \text{ seconds}} & \text{otherwise} \end{cases}$ |

TABLE 8-continued

| | whether a QoE guarantee condition is achieved (QoE achievement degree) | Scheduling metric *scheduling parameter: $(A_1, A_2, B_1, B_2, C_1, C_2) = (15, 1, 2, 2, 100, 100)$ |
|---|---|---|
| first terminal using video service | X (90%) | scheduling metric $\begin{cases} \dfrac{\text{current transmission capacity}}{\text{average throughput in recent } A_2 \text{ seconds}} \times C_2 & \text{if} \left( \dfrac{\text{average throughput in}}{\text{recent } A_2 \text{ seconds}} \right) \leq B_2 \\ \dfrac{\text{current transmission capacity}}{\text{average throughput in recent } A_2 \text{ seconds}} & \text{otherwise} \end{cases}$ |
| second terminal using video service | X (90%) | scheduling metric $\begin{cases} \dfrac{\text{current transmission capacity}}{\text{average throughput in recent } A_3 \text{ seconds}} \times C_3 & \text{if} \left( \dfrac{\text{average throughput in}}{\text{recent } A_3 \text{ seconds}} \right) \leq B_3 \\ \dfrac{\text{current transmission capacity}}{\text{average throughput in recent } A_3 \text{ seconds}} & \text{otherwise} \end{cases}$ |

Referring to Table 8, if the same scheduling scheme is applied although the number of the terminals using the service is changed, the QoE may not be achieved for the new second terminal, as well as the existing first terminal.

Figure 7:
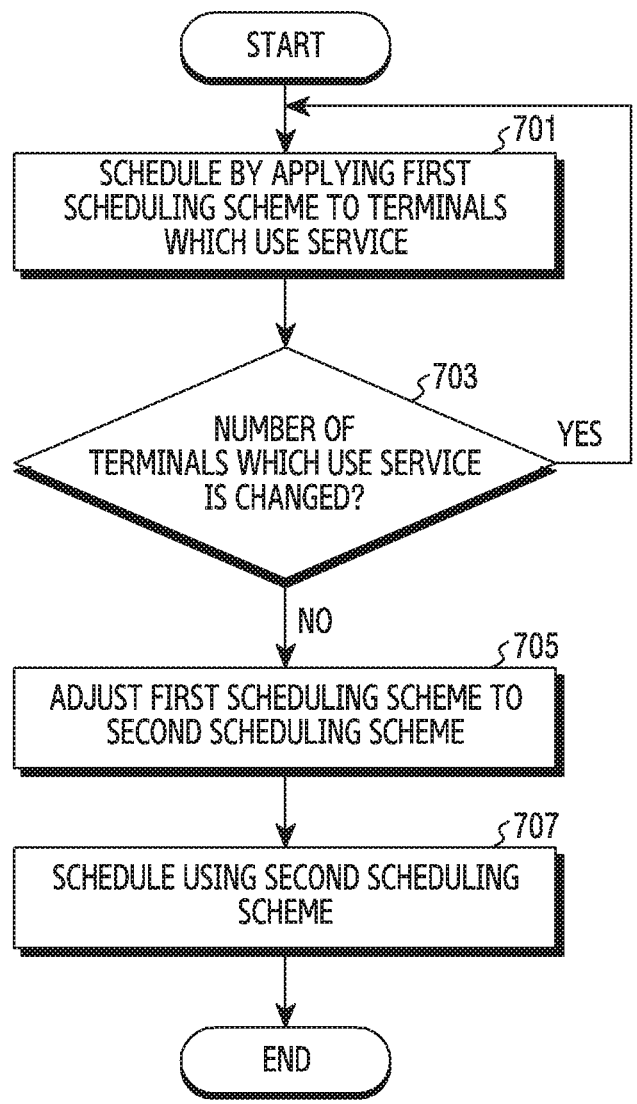
FIG. 7 illustrates a flowchart of a base station for adjusting a scheduling scheme according to the number of terminals which use a service in a wireless communication system according to various embodiments of the present disclosure.

Hence, various embodiments of the present disclosure provide a method for adaptively determining the scheduling scheme according to the change of the number of the terminals using the service, which shall be elucidated in FIG. 7.

FIG. 7 illustrates a flowchart of a base station for adjusting a scheduling scheme according to the number of terminals which use a service in a wireless communication system according to various embodiments of the present disclosure. FIG. 7 illustrates operations of the base station 110.

Referring to FIG. 7, in step 701, the base station performs scheduling by applying a first scheduling scheme to terminals which use the service. For example, the base station may perform the scheduling on the terminals which use the service based on the first scheduling scheme in which at least one scheduling parameter is set to a first value(s).

In step 703, the base station determines whether the number of the terminals which use the service is changed. In other words, the base station may determine whether a new terminal starts to use the service and the number of the terminals which use the service increases, whether an existing terminal stops using the terminal and the number of the terminals which use the service decreases, or whether the number of the terminals which use the service maintains. If the number of the terminals which use the service does not change, the base station may return to step 701, and perform scheduling by applying an existing first scheduling scheme to the terminals which use the service.

If the number of the terminals which use the service changes, in step 705, the base station changes the first scheduling scheme to a second scheduling scheme. For example, if the number of the terminals which use the service increases, the base station determines the second scheduling scheme in which at least one scheduling parameter is set to a second value(s) to increase a scheduling opportunity for each terminal which uses the service, and changes the first scheduling scheme to the second scheduling scheme. As another example, if the number of the terminals which use the service decreases, the base station determines the second scheduling scheme in which at least one scheduling parameter is set to a second value(s) to maintain or decrease the scheduling opportunity for each terminal which uses the service, and changes the first scheduling scheme to the second scheduling scheme.

In step 707, the base station performs the scheduling using the second scheduling scheme. For example, the base station may perform the scheduling on the terminals which use the service based on the second scheduling scheme in which at least one scheduling parameter is set to the second value(s).

For example, an example in which the scheduling parameter {A2, B2, C2}={1, 2, 100} for the video service using terminal in Table 7 is changed to {A2', B2', C2' }={A3', B3', C3'}={0.5, 2, 100} according to the change of the terminals which use the video service is given as the following Table 9.

TABLE 9

| | whether a QoE guarantee condition is achieved (QoE achievement degree) | Scheduling metric *scheduling parameter $(A_1, A_2', A_3', B_1, B_2, C_1, C_2, C_3) = (15, 0.5, 0.5, 2, 2, 2, 100, 100, 100)$ |
|---|---|---|
| web service using terminal | O (95%) | scheduling metric $\begin{cases} \dfrac{\text{current transmission capacity}}{\text{average throughput in recent } A_1 \text{ seconds}} \times C_1 & \text{if} \left( \dfrac{\text{average throughput in}}{\text{recent } A_1 \text{ seconds}} \right) \leq B_1 \\ \dfrac{\text{current transmission capacity}}{\text{average throughput in recent } A_1 \text{ seconds}} & \text{otherwise} \end{cases}$ |

TABLE 9-continued

| | whether a QoE guarantee condition is achieved (QoE achievement degree) | | Scheduling metric *scheduling parameter $(A_1, A_2', A_3', B_1, B_2, C_1, C_2, C_3) = (15, 0.5, 0.5, 2, 2, 2, 100, 100, 100)$ |
|---|---|---|---|
| first terminal using video service | O (95%) | scheduling metric | $\begin{cases} \dfrac{\text{current transmission capacity}}{\text{average throughput in recent } A_2' \text{ seconds}} \times C_2 & \text{if}\left(\dfrac{\text{average throughput in}}{\text{recent } A_2' \text{ seconds}}\right) \leq B_2 \\ \dfrac{\text{current transmission capacity}}{\text{average throughput in recent } A_2' \text{ seconds}} & \text{otherwise} \end{cases}$ |
| second terminal using video service | O (95%) | scheduling metric | $\begin{cases} \dfrac{\text{current transmission capacity}}{\text{average throughput in recent } A_3' \text{ seconds}} \times C_3 & \text{if}\left(\dfrac{\text{average throughput in}}{\text{recent } A_3' \text{ seconds}}\right) \leq B_3 \\ \dfrac{\text{current transmission capacity}}{\text{average throughput in recent } A_3' \text{ seconds}} & \text{otherwise} \end{cases}$ |

Referring to Table 9, the QoE is guaranteed for all of the web service using terminal, the video service using first terminal and the video service using second terminal, the scheduling parameter for the web service using terminal is {A1, B1, C1}={15, 2, 100}, the scheduling parameter for the video service using first terminal is {A2', B2', C2'}={0.5, 2, 100}, and the scheduling parameter for the video service using second terminal is {A3', B3', C3'}={0.5, 2, 100}. In other words, by adaptively determining the scheduling parameter according to the change of the number of the terminals which use the service, the QoE may be achieved for more terminals.

According to various embodiments of the present disclosure, although the number of the terminals which use the service is changed, the scheduling scheme may not be adjusted. For example, although the number of the terminals which use the service increase, if the service class of the service is low, the scheduling scheme may not be adjusted to increase the scheduling opportunity for the terminals. In other words, the scheduling scheme may be adjusted based on the number of the terminals which use the service and the service class of the corresponding service.

According to various embodiments of the present disclosure, the QoE for all the scheduling target terminals may not be satisfied. In other words, the QoE for at least one of the scheduling target terminals may not be achieved. For example, as shown in the following Table 10, the QoE for the web service using terminal and the video service using terminal may not be achieved.

TABLE 10

| | whether a QoE guarantee condition is achieved (QoE achievement degree) | | Scheduling metric *scheduling parameter $(A_1, A_2, B_1, B_2, C_1, C_2) = (15, 1, 2, 2, 100, 100)$ |
|---|---|---|---|
| web service using terminal | X (50%) | scheduling metric | $\begin{cases} \dfrac{\text{current transmission capacity}}{\text{average throughput in recent } A_1 \text{ seconds}} \times C_1 & \text{if}\left(\dfrac{\text{average throughput in}}{\text{recent } A_1 \text{ seconds}}\right) \leq B_1 \\ \dfrac{\text{current transmission capacity}}{\text{average throughput in recent } A_1 \text{ seconds}} & \text{otherwise} \end{cases}$ |
| terminal using video service | X (50%) | scheduling metric | $\begin{cases} \dfrac{\text{current transmission capacity}}{\text{average throughput in recent } A_2 \text{ seconds}} \times C_2 & \text{if}\left(\dfrac{\text{average throughput in}}{\text{recent } A_2 \text{ seconds}}\right) \leq B_2 \\ \dfrac{\text{current transmission capacity}}{\text{average throughput in recent } A_2 \text{ seconds}} & \text{otherwise} \end{cases}$ |

Referring to Table 10, the scheduling parameters {A1, B1, C1}={15, 2, 100} of three types may be applied to determine the scheduling of the web service using terminal, and the scheduling parameters {A2, B2, C2}={1, 2, 100} of three types may be applied to determine the scheduling of the video service using terminal. According to various embodiments of the present disclosure, if the service class of the video service using terminal is higher than the service class of the web service using terminal, the base station may restrict the scheduling on the web service using terminal belonging to the low service class. In other words, if the QoE may not be achieved for all the scheduling target terminals, the base station may restrict the scheduling on the web service using terminal belonging to the low service class.

Figure 8:
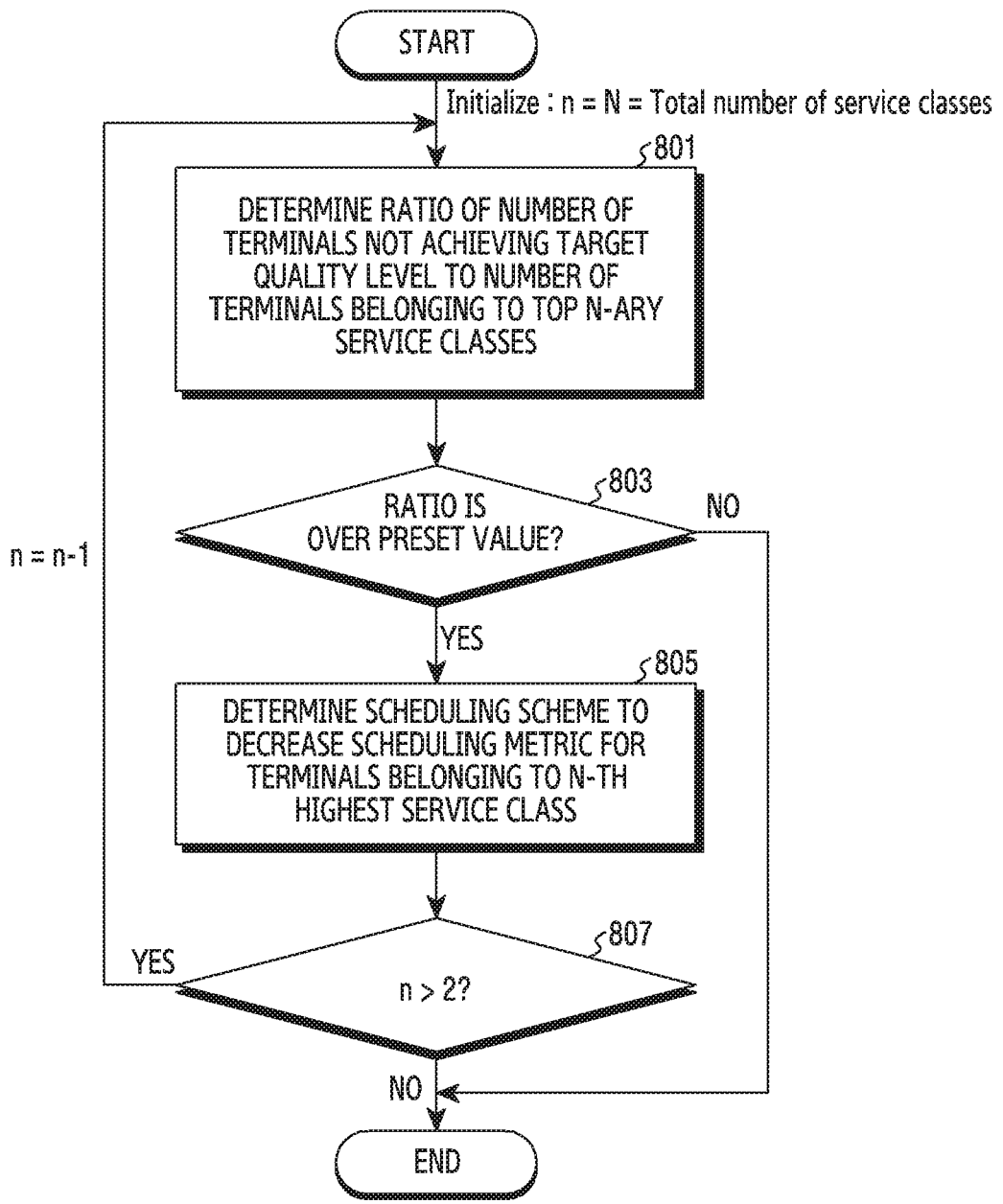
FIG. 8 illustrates a flowchart of a base station for controlling scheduling based on a service class in a wireless communication system according to various embodiments of the present disclosure.

Hereafter, specific operations for restricting the scheduling on the terminals belonging to the low service class are described in FIG. 8.

FIG. 8 illustrates a flowchart of a base station for controlling scheduling based on a service class in a wireless communication system according to various embodiments of the present disclosure. FIG. 8 illustrates operations of the base station 110.

Referring to FIG. 8, in step 801, the base station determines a ratio of the number of terminals not achieving a target quality level to the number of terminals belonging to top n-ary service classes. Herein, an initial value of n is N, and N indicates the total number of service classes. The base station may measure data processing states of the terminals belonging to the top n-ary service classes respectively, determine whether the processing state achieves the target quality level per terminal, and determine the ratio of the number of terminals not achieving the target quality level to the number of the terminals belonging to the top n-ary service classes.

In step 803, the base station determines whether the determined ratio is over a preset value. For example, the base station may determine whether the terminals not achieving the target quality level exceed 5% of total terminals belonging to the top n-ary service classes. Herein, the preset value 5% is exemplary, and the preset value may change according to a scheduling policy of the base station. In step 803, if determining that the ratio is not over the preset value, the base station may determine not to control the scheduling based on the service class, and finish this algorithm.

If the ratio of the terminals not achieving the target quality level is over the preset value, in step 805, the base station determines a scheduling scheme to decrease a scheduling metric for the terminals belonging to an n-th highest service class. In other words, the base station may determine the scheduling scheme to restrict the scheduling of terminals belonging to the lowest n-th service among the top n-ary service classes, and thus a scheduling opportunity for terminals belonging to top n−1-ary service classes may increase.

In step 807, whether n is greater than 2 is determined. If n is greater than 2, that is, if operations of step 801 through step 805 are performed on three or more service classes, the base station repeats operations after step 801 with respect to the top n−1-ary service classes. By contrast, if n is not greater than 2, that is, if operations of step 801 through step 805 are performed on two service classes, the base station finishes this algorithm That is, according to various embodiments of the present disclosure, if the ratio of the terminals not achieving the target quality level is over the preset value, the base station may sequentially restrict the scheduling from terminals belonging to the lowest service class to terminals belonging to the second highest service class.

According to various embodiments of the present disclosure, to control the scheduling based on the service class, an additional scheduling parameter may be used. For example, to restrict the scheduling for the web service using terminal belonging to the low service class in Table 10, additional scheduling parameters D1 and D2 may be used as shown in the following Table 11.

TABLE 11

| | whether a QoE guarantee condition is achieved (QoE achievement degree) | Scheduling metric *scheduling parameter $(A_1, A_2, B_1, B_2, C_1, C_2, D_1, D_2) = (15, 1, 2, 2, 100, 100, 1, 200)$ |
|---|---|---|
| web service using terminal | X (10%) | scheduling metric $\begin{cases} \dfrac{\text{current transmission capacity}}{\text{average throughput in recent } A_1 \text{ seconds}} \times C_1 \times D_1 & \text{if} \left( \dfrac{\text{average throughput in}}{\text{recent } A_1 \text{ seconds}} \right) \leq B_1 \\ \dfrac{\text{current transmission capacity}}{\text{average throughput in recent } A_1 \text{ seconds}} \times D_1 & \text{otherwise} \end{cases}$ |
| terminal using video service | O (100%) | scheduling metric $\begin{cases} \dfrac{\text{current transmission capacity}}{\text{average throughput in recent } A_2 \text{ seconds}} \times C_2 \times D_2 & \text{if} \left( \dfrac{\text{average throughput in}}{\text{recent } A_2 \text{ seconds}} \right) \leq B_2 \\ \dfrac{\text{current transmission capacity}}{\text{average throughput in recent } A_2 \text{ seconds}} \times D_2 & \text{otherwise} \end{cases}$ |

Comparing with Table 10, while the values of the parameters {A1, B1, C1} applied to the web service using terminal and the parameters {A2, B2, C2} applied to the video service using terminal are identical, the additional parameter values D1=1 and D2=200 are applied to the web service using terminal and the video service using terminal respectively. In other words, by applying the low D1 value to the web service using terminal belonging to the low service class, the base station may restrict the scheduling of the web service using terminal, and increase the scheduling opportunity for the video service using terminal. Table 11 shows that the QoE for the video service using terminal may be achieved unlike Table 10, according to such scheduling.

In the above example, it has been described that the additional scheduling parameter may be used to control the scheduling based on the service class. However, this is exemplary, and the scheduling for the terminals belonging to the low service class may be restricted using the existing parameters without using the additional parameter. For example, in the situation of Table 10, the base station may restrict the scheduling of the web service using terminal, by setting the parameter C1 value for the web service using terminal belonging to the low service class to be low, and by setting the parameter C2 value for the video service using terminal belonging to the high service class to be high.

According to various embodiments of the present disclosure, the device (e.g., the base station 110) which performs the scheduling by considering the QoE and/or the service class may be referred to as a user centric scheduler. The user centric scheduler may be different in some respects by comparing with a scheduler (hereafter, a proportional fairness (PF) scheduler) which considers the throughput fairness. For example, one of various differences between the user centric scheduler and the PF scheduler are shown in the following Table 12.

using terminal may be achieved. Referring to Table 13, the QoE guarantee condition ('the rate that "the average throughput during the buffer occupancy time" measured every 30 seconds exceeds 2 Mbps') for the web service using terminal is more strict than the QoE guarantee condition ('the rate that "the average throughput during the buffer occupancy time" measured every 2 seconds exceeds

TABLE 12

| | PF scheduler | | user centric scheduler *scheduling parameter $(A_1, A_2, B_1, B_2, C_1, C_2) = (15, 1, 2, 2, 100, 100)$ |
|---|---|---|---|
| web service using terminal | scheduling metric $\dfrac{\text{current transmission capacity}}{\text{average throughput in recent } A \text{ seconds}}$ | scheduling metric | $\begin{cases} \dfrac{\text{current transmission capacity}}{\text{average throughput in recent } A_1 \text{ seconds}} \times C_1 & \text{if } \left(\dfrac{\text{average throughput in}}{\text{recent } A_1 \text{ seconds}}\right) \leq B_1 \\ \dfrac{\text{current transmission capacity}}{\text{average throughput in recent } A_1 \text{ seconds}} & \text{otherwise} \end{cases}$ |
| terminal using video service | | scheduling metric | $\begin{cases} \dfrac{\text{current transmission capacity}}{\text{average throughput in recent } A_2 \text{ seconds}} \times C_2 & \text{if } \left(\dfrac{\text{average throughput in}}{\text{recent } A_2 \text{ seconds}}\right) \leq B_2 \\ \dfrac{\text{current transmission capacity}}{\text{average throughput in recent } A_2 \text{ seconds}} & \text{otherwise} \end{cases}$ |

Referring to Table 12, the PF scheduler applies the same scheduling scheme to the web service using terminal and the video service using terminal, whereas the user centric scheduler applies different scheduling schemes (e.g., different scheduling parameters) to the web service using terminal and the video service using terminal. An example of the scheduling result according to applying the scheduling scheme as shown in Table 12 is given as the following Table 13.

TABLE 13

| | | whether a QoE guarantee condition is achieved (QoE achievement degree) | |
|---|---|---|---|
| | QoE achievement degree | PF scheduler | *scheduling parameter $(A_1, A_2, B_1, B_2, C_1, C_2) = $ (15, 1, 2, 2, 100, 100) |
| web service using terminal | rate that the average throughput during the buffer occupancy time" measured every 30 seconds exceeds 2 Mbps' is equal to or greater than 95% | ○ (100%) | ○ (950%) |
| terminal using video service | rate that the average throughput during the buffer occupancy time" measured every 2 seconds exceeds 2 Mbps' is equal to or greater than 95% | X (70%) | ○ (950%) |

According to Table 13, as the result of the scheduling by the PF scheduler, the QoE for the web service using terminal is achieved, but the QoE for the video service using terminal is not achieved. By contrast, as the result of the scheduling by the user centric scheduler, both of the QoE for the web service using terminal and the QoE for the video service 2 Mbps') for the video service using terminal. The PF scheduler applies the same scheduling scheme to all the terminals, without considering the different QoE guarantee condition for each terminal. By contrast, the user centric scheduler determines the scheduling scheme per terminal (or, per service, per service class), by considering the different QoE guarantee condition for each terminal. Thus, as the result of the scheduling by the user centric scheduler, the QoE for each of the scheduling target terminals may be achieved more easily. For example, as the QoE guarantee condition for a specific terminal is strict, the user centric scheduler may determine the scheduling scheme for the corresponding terminal to increase a scheduling opportunity for the corresponding terminal by more sensitively responding to the throughput decrease of the corresponding terminal.

Figure 9:
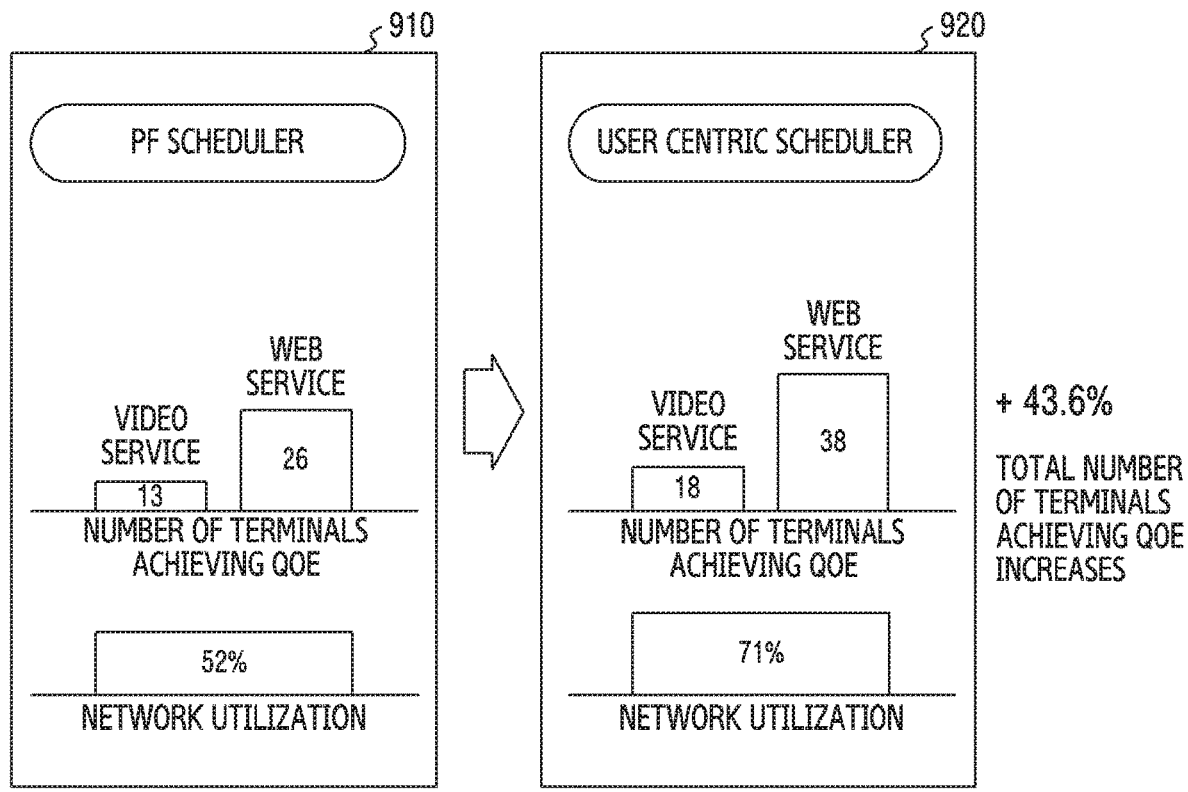
FIG. 9 illustrates performance of each of a proportional fairness (PF) scheduler and a user centric scheduler in a wireless communication system according to various embodiments of the present disclosure.

Hereafter, performance of the PF scheduler and the user centric scheduler is explained in more detail, in FIG. 9.

FIG. 9 illustrates performance of a PF scheduler 910 and a user centric scheduler 920 in a wireless communication system according to various embodiments of the present disclosure. FIG. 9 depicts scheduling simulation results if a video played at average 2 Mbps and a web page of an average size 2.5 Mbytes are rendered, and an average of a ratio of an active time to an idle time is 1:3. In FIG. 9, it is assumed that the QoE guarantee condition for the web service using terminal is 'the rate that "the average throughput during the buffer occupancy time" measured every 30 seconds exceeds 2 Mbps', and the QoE guarantee condition for the video service using terminal is assumed to be 'the rate that "the average throughput during the buffer occupancy time" measured every 2 seconds exceeds 2 Mbps'.

Referring to FIG. 9, as the result of the scheduling by the PF scheduler 910, the number of the video service using terminals which achieve the QoE is 13, and the number of the web service using terminals which achieve the QoE is 26. As the result of the scheduling by the PF scheduler 910, the total number of the terminals which achieve the QoE is 39, and network utilization of 52% is achieved.

By contrast, as the result of the scheduling by the user centric scheduler 920, the number of the video service using terminals which achieve the QoE is 18, and the number of the web service using terminals which achieve the QoE is 38. As the result of the scheduling by the user centric scheduler 920, the total number of the terminals which achieve the QoE is 56, and the network utilization of 71% is achieved.

Referring to FIG. 9, by comparing with the PF scheduler 910, as the result of the scheduling by the user centric scheduler 920, the total number of the terminals which achieve the QoE may increase 43.6%, and the network utilization may increase 19%. In other words, the user centric scheduler 920 may enable more terminals to achieve the QoE, and more efficiently use network resources.

The methods according to the embodiments described in the claims or the specification of the present disclosure may be implemented in hardware, software, or a combination of hardware and software.

In software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, LAN, wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has been described with reference to certain embodiments thereof, but various modifications may be made without departing from the scope of this disclosure. Therefore, the scope of this disclosure should not be limited to the described embodiments but should be defined by the scope of the claims as below and their equivalents.

The invention claimed is:

1. A method performed by a base station in a wireless communication system, the method comprising:
obtaining at least one value indicating a processing state of data for a plurality of terminals;
determining a ratio of a number of terminals not achieving a target quality level to a number of the plurality of terminals; and
determining a scheduling scheme for each of the plurality of terminals, based on whether the at least one value achieves the target quality level corresponding to each of the plurality of terminals,
wherein, in case that the ratio is over a preset value, the scheduling scheme for each of the plurality of terminals is determined to decrease a scheduling metric for terminals belonging to a lowest service class among a plurality of service classes.

2. The method of claim 1, wherein determining the scheduling scheme comprises:
determining an achievement degree at which the at least one value achieves the target quality level;
if the achievement degree increases from a previous achievement degree, determining the scheduling scheme to decrease the scheduling metric; and
if the achievement degree decreases from the previous achievement degree, determining the scheduling scheme to increase the scheduling metric.

3. The method of claim 2, wherein determining the scheduling scheme comprises:
determining the scheduling scheme, based on a difference between the achievement degree and the previous achievement degree.

4. The method of claim 1,
wherein the plurality of terminals are determined based on at least one of a service used by the plurality of terminals or a service class to which the plurality of terminals belong, and
wherein the target quality level corresponds to at least one of the service or the service class.

5. The method of claim 1, wherein the scheduling scheme is adjusted based on a change of a number of terminals which use a same service as the plurality of terminals.

6. The method of claim 1, wherein obtaining the at least one value indicating the processing state of the data for the plurality of terminals comprises measuring at least one value indicating the processing state of the data for the plurality of terminals, and
further comprising determining a scheduling metric for each of the plurality of terminals, by applying the at least one value to the scheduling scheme.

7. A method performed by a base station in a wireless communication system, the method comprising:
measuring at least one value indicating a processing state of data for a plurality of terminals;
transmitting, to other node, information comprising the at least one value;
receiving, from the other node, information relating to a scheduling scheme for each of the plurality of terminals, based on whether the at least one value achieves a target quality level corresponding to each of the plurality of terminals; and
determining a scheduling scheme for each of the plurality of terminals, by applying the at least one value to the scheduling scheme,
wherein, in case that a ratio of a number of terminals not achieving the target quality level to a number of the plurality of the terminals is over a preset value, the scheduling scheme for each of the plurality of the terminals is determined to decrease a scheduling metric for terminals belonging to a lowest service class among a plurality of service classes.

8. The method of claim 7,
wherein, if an achievement degree at which the at least one value achieves the target quality level increases from a previous achievement degree, the scheduling scheme is determined to decrease the scheduling metric, and
wherein, if the achievement degree decreases from the previous achievement degree, the scheduling scheme is determined to increase the scheduling metric.

9. The method of claim 8, wherein the scheduling scheme is determined based on a difference between the achievement degree and the previous achievement degree.

10. The method of claim 7,
wherein the plurality of terminals are determined based on at least one of a service used by the plurality of terminals or a service class to which the plurality of terminals belong, and
wherein the target quality level corresponds to at least one of the service or the service class.

11. The method of claim 7, wherein the scheduling scheme is adjusted based on a change of a number of terminals which use a same service as the plurality of terminals.

12. A base station in a wireless communication system, the base station comprising:
at least one transceiver; and
at least one processor operably coupled to the at least one transceiver,
wherein the at least one processor is configured to:
obtain at least one value indicating a processing state of data for a plurality of terminals,
determine a ratio of a number of terminals not achieving a target quality level to a number of the plurality of terminals, and
determine a scheduling scheme for each of the plurality of terminals, based on whether the at least one value achieves a target quality level corresponding to each of the plurality of terminals, and
wherein, in case that the ratio is over a preset value, the scheduling scheme for each of the plurality of the terminals is determined to decrease a scheduling metric for terminals belonging to a lowest service class among a plurality of service classes.

13. The base station of claim 12, wherein the at least one processor is further configured to:
determine an achievement degree at which the at least one value achieves the target quality level,
if the achievement degree increases from a previous achievement degree, determine the scheduling scheme to decrease a scheduling metric, and
if the achievement degree decreases from the previous achievement degree, determine the scheduling scheme to increase the scheduling metric.

14. The base station of claim 13, wherein the at least one processor is further configured to determine the scheduling scheme, based on a difference between the achievement degree and the previous achievement degree.

15. The base station of claim 12,
wherein the plurality of terminals are determined based on at least one of a service used by the plurality of terminals or a service class to which the plurality of terminals belong, and
wherein the target quality level corresponds to at least one of the service and or the service class.

16. The base station of claim 12, wherein the scheduling scheme is adjusted based on a change of a number of terminals which use a same service as the plurality of terminals.

17. The base station of claim 12, wherein the at least one processor is further configured to:
measure at least one value indicating the processing state of the data for the at least one terminal, and
determine a scheduling metric for the at least one terminal, by applying the at least one value to the scheduling scheme.

* * * * *